O. FARRA.
Improvement in Hemp-Harvesters.
No. 126,793. Patented May 14, 1872.
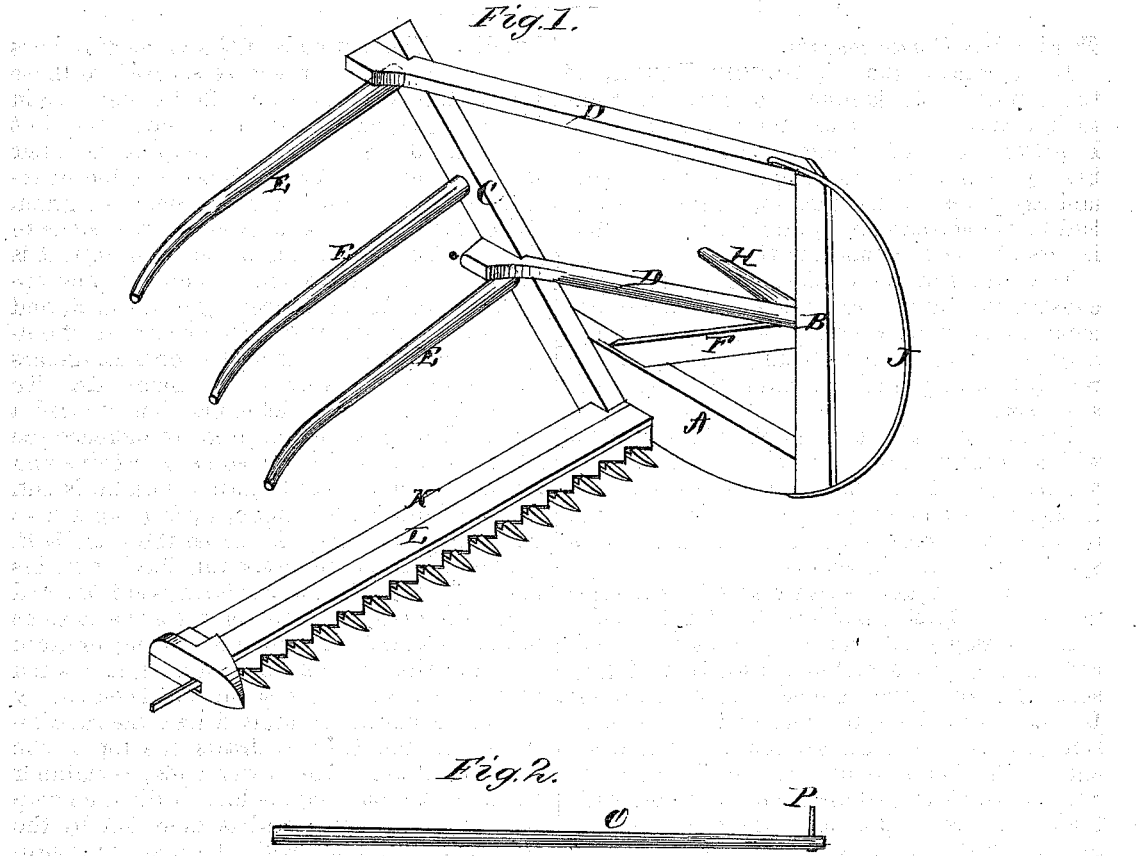
Witnesses
John A. Ellis
Wm R. Ellis
Inventor
Oliver Farra
Per
T. H. Alexander
Atty.

126,793

UNITED STATES PATENT OFFICE.

OLIVER FARRA, OF JESSAMINE COUNTY, KENTUCKY.

IMPROVEMENT IN HEMP-HARVESTERS.

Specification forming part of Letters Patent No. 126,793, dated May 14, 1872.

*To all whom it may concern:*

Be it known that I, OLIVER FARRA, of the county of Jessamine and State of Kentucky, have invented certain new and useful Improvements in Mowing-Machines; and I do hereby declare the following to be a full, clear, and exact description thereof, reference being had to the accompanying drawing and to the letters of reference marked thereon.

The nature of my invention consists in the construction and arrangement of an attachment to mowers, whereby hemp, grain, &c., may be cut with great facility and accuracy, raked, and deposited in bundles of any desired size.

In order to enable others skilled in the art to which my invention appertains to make and use the same, I will now proceed to describe its construction and operation, referring to the annexed drawing which forms a part of this specification, and in which—

Figure 1 is a perspective view of the attachment, and Fig. 2 is a side view of the rake.

A represents the bottom part of the frame constituting my attachment, which is firmly secured to the dividing piece of the sickle-bar L, and has its front and rear ends rounded to run with ease over the ground. At the front end of the bar A is an upright, B, the front edge of which is V-shaped, and provided with the curved iron rod J for parting the hemp or grain. This separator J should extend sufficiently high to thoroughly divide the stalks; and it will be observed it is so formed as to divide them some distance above the ground, and not at or very near the roots of the hemp, as has been heretofore the case with machines for the same purpose. At the rear end of the bar A is another upright, C, which inclines backward and inward, and is connected with the front uprights B by means of horizontal bars D D. These bars are wider at their rear ends, and curved, as shown, so as to facilitate the delivery of the hemp or grain onto the receiving-arms E E, which are framed into the rear upright C, and sustain the hemp, &c., as long as necessary for making the desired bundle. The rear ends of the connecting-bars D D are bolted or otherwise secured to these arms. The arms E E, it will be seen, are in line with the back edge of the sickle-bar, but inclined to its top face, drooping at their points, so as to offer the least friction or resistance to the delivery of the hemp or grain. These points are also curved forward so as to hold the hemp or grain in position until it is desired to drop the same. The bar A and upright B are further braced by a brace, F, and to the said upright is secured an arm, H, standing at an angle to relieve the connecting-bars D D from the pressure of the hemp, &c. To the rear edge of the sickle-bar L is secured a plank, K, or sheet-metal plate, to increase the width of said sickle-bar so as to receive and sustain the hemp, &c., until a bundle is cut. O is a handle with a hook, P, forming a rake for raking the hemp, &c., from the arms E E.

The driver or an assistant, having in his hands the rake O P, when the mower is started throws the rake forward of the arms E so as to inclose a sufficient amount of hemp or grain to make the desired-sized bundle, and when he sees that all of the same has been cut by the sickle he immediately draws the rake toward him, and thereby draws the top of the hemp or grain. The lower ends, remaining on the sickle-bar, enable him to tilt the hemp down on the ground, and is there left by the machine. The man, with the rake, then proceeds to perform a similar and continuous operation to the one just described, which is performed with great facility and success by persons of common observation and experience.

Having thus fully described my invention, what I claim as new, and desire to secure by Letters Patent, is—

The curved elevated divider J, constructed and arranged to separate the hemp, substantially in the manner set forth.

OLIVER FARRA.

Witnesses:
A. J. CAMPBELL,
JOHN MCMURTY.